(12) United States Patent
Paul et al.

(10) Patent No.: US 10,365,972 B2
(45) Date of Patent: Jul. 30, 2019

(54) STORAGE SYSTEMS

(71) Applicants: HEWLETT-PACKARD DEVELOPMENT COMPANY, L.P.; Reny Paul, Bangalore, Karnataka (IN); Karthick Tharakraj, Bangalore, Karnataka (IN)

(72) Inventors: Reny Paul, Bangalore (IN); Karthick Tharakraj, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 15/542,907

(22) PCT Filed: Apr. 30, 2015

(86) PCT No.: PCT/IN2015/000191
§ 371 (c)(1),
(2) Date: Jul. 11, 2017

(87) PCT Pub. No.: WO2016/174681
PCT Pub. Date: Nov. 3, 2016

(65) Prior Publication Data
US 2018/0039549 A1 Feb. 8, 2018

(51) Int. Cl.
*G06F 11/14* (2006.01)
*G06F 11/20* (2006.01)
*G06F 3/06* (2006.01)

(52) U.S. Cl.
CPC .......... *G06F 11/1451* (2013.01); *G06F 3/065* (2013.01); *G06F 3/067* (2013.01);
(Continued)

(58) Field of Classification Search
CPC ............ G06F 11/1451; G06F 11/1456; G06F 11/1458; G06F 11/1466; G06F 11/1469;
(Continued)

(56) References Cited

U.S. PATENT DOCUMENTS

| 7,185,169 B2 | 2/2007 | Biessener et al. |
| 7,979,690 B1 | 7/2011 | Dyatlov et al. |

(Continued)

FOREIGN PATENT DOCUMENTS

| CN | 101414277 A | 4/2009 |
| CN | 103150123 A | 6/2013 |

(Continued)

OTHER PUBLICATIONS

"Clearway Corp"; http://www.clearwaycorp.com/cloud/cloud-integrated-storage.html; printed Mar. 11, 2015; 2 pages.

(Continued)

*Primary Examiner* — Zhuo H Li
(74) *Attorney, Agent, or Firm* — HPI Patent Department (57) ABSTRACT

The present subject matter relates to storage systems. In an example method, a write request is received from a computing device in a data backup mode. Data associated with the write request is written to a primary storage drive of a storage system when the write request is for an unallocated block of the primary storage drive. The data associated with the write request is written to a secondary storage drive of the storage system when the write request is for an allocated block of the primary storage drive.

15 Claims, 7 Drawing Sheets

(52) U.S. Cl.
CPC ......... *G06F 3/0619* (2013.01); *G06F 3/0631* (2013.01); *G06F 11/1456* (2013.01); *G06F 11/1458* (2013.01); *G06F 11/1466* (2013.01); *G06F 11/1469* (2013.01); *G06F 11/2076* (2013.01); *G06F 2201/84* (2013.01)

(58) Field of Classification Search
CPC ............ G06F 11/2076; G06F 2201/84; G06F 3/0619; G06F 3/0631; G06F 3/065; G06F 3/067
See application file for complete search history.

(56) References Cited

U.S. PATENT DOCUMENTS

| | | |
|---|---|---|
| 8,799,557 B1 | 8/2014 | Chen |
| 2005/0188248 A1 | 8/2005 | O'Brien et al. |
| 2007/0033356 A1 | 2/2007 | Erlikhman |
| 2009/0125680 A1* | 5/2009 | Ninose ................. G06F 3/0608 711/114 |
| 2010/0115332 A1 | 5/2010 | Zheng et al. |
| 2012/0054152 A1 | 3/2012 | Adkins et al. |
| 2012/0151136 A1 | 6/2012 | Hay et al. |
| 2013/0132668 A1* | 5/2013 | Kashiyama ........... G06F 3/0608 711/114 |
| 2013/0346709 A1 | 12/2013 | Wang |

FOREIGN PATENT DOCUMENTS

| | | |
|---|---|---|
| EP | 2704011 | 3/2014 |
| TW | 200300531 A | 6/2003 |
| TW | 200303466 A | 9/2003 |
| TW | 201133240 A1 | 10/2011 |

OTHER PUBLICATIONS

"Just Add Water? Memeo Instant Backup"; Sep. 19, 2009; 24 pages; http://www.fileslinger.com/2009/09/19/just-add-water-memeo-instant-backup/;.

* cited by examiner

STORAGE SYSTEMS

BACKGROUND

Computing systems, such as desktop computers, laptop computers, hand-held computers, servers, and the like, are associated with storage systems for storing data. The data may include operating system data, applications data, and user data that are generated and utilized during the operation of the computing system. The data in the storage system are generally backed up so that the computing system can be restored to a previously known state of working.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

System restore refers to a process of reverting a computing system to a previously known state. The computing system may be restored, for example, when an operating system of the computing system is not bootable, or the computing system is infected with viruses or malware, or has misconfigured application updates. The computing system may also be restored in case a user, for some reason, wishes to bring the computing system back to an earlier known state. For restoring the computing system, the data in a storage system associated with the computing system are backed up. Data backup is a process of saving and preserving data at a storage space which can be utilized and recovered for restoring the computing system to a previously known state.

Generally, in a data backup operation in a storage system, a copy of data is saved and preserved at a separate storage space in the storage system. Saving a copy of data amounts to duplication of data in the storage system. Thus, a substantially large storage space is utilized in the storage system. Further, the data may have to be copied and saved frequently in order to prevent loss of latest data. Frequent copying and saving of data are time consuming and cumbersome. Furthermore, in case some data are stored in the storage system after the last data backup operation, that data cannot be recovered.

Data backup is also performed by storing data written before initiating a data backup operation in a first storage drive and storing all the data written after initiating the data backup operation in a second storage drive. Thus, the data written before and after initiating the data backup operation are saved in different storage drives. Here, although, the data backup is instantaneous, the second storage drive of a substantially large size is utilized for storing the data written during the data backup operation. This increases the backup storage space requirement for the storage system.

The present subject matter describes methods and systems for data backup, system restore, and recovery of latest data. The data are backed up in a manner that a storage space of a storage system is efficiently utilized. With the data backup, the system restore, and the data recovery, in accordance with the present subject matter, a computing system can be restored to a working state in a manner that appears instantaneous to a user, and the latest data, stored before restoring the computing system, can also be recovered.

In accordance with the present subject matter, the storage system associated with the computing system includes a primary storage drive and a secondary storage drive. In an example implementation, the primary storage drive may be the main storage drive of the storage system, where all the data are primarily stored. The secondary storage drive may be a backup storage drive having a backup file, where the data may be written during a data backup operation. The data backup operation is performed after receiving a data backup request from a user of the computing system. The computing system is said to be operating in a data backup mode during the data backup operation.

In an example implementation of the present subject matter, on receiving a write request for writing data to a particular block of the primary storage drive during the data backup mode of operation, it is determined whether that block is allocated or unallocated. A block of a storage drive is said to be allocated if the block is used by a file system. A block of a storage drive is said to be unallocated if the block is not used by a file system. When the write request is determined to be for an unallocated block of the primary storage drive, then the data associated with the write request are written to the primary storage drive. Whereas, when the write request is determined to be for an allocated block of the primary storage drive, then the data associated with the write request are written to the secondary storage drive.

In accordance with the present subject matter, the data written before the data backup mode of operation and during the data backup mode of operation are stored and preserved separately, which can be later used for restoring the computing system. This methodology facilitates backup of data without duplication, or saving a copy, of the data for backup. Further, since the unallocated blocks of the primary storage drive are utilized for writing the data during the data backup mode of operation, the size of the secondary storage drive can be small. This facilitates in reducing the backup storage space requirement for the storage system. In an example implementation, the secondary storage drive may have a size substantially equal to the size of the data stored in the primary storage drive before initiating the data backup.

Further, write operations executed during the data backup mode of operation are tracked and the information of such write operations is stored, for example, in tables. For this, in an example implementation, the information of the blocks of the primary storage drive that are allocated during the data backup mode of operation is stored in a primary storage mapping (PSM) table, and the information of the unallocated blocks and the allocated blocks of the secondary storage drive is stored in a secondary storage mapping (SSM) table.

While operating in the data backup mode, if a system restore request is received for restoring the computing system, the PSM table and the SSM table are disregarded, i.e., not considered, for reading and writing of data subsequently from the storage system. By disregarding the PSM table and the SSM table, the computing system is restored to a state existed just before the data backup is initiated in a manner that appears instantaneous to the user.

Further, after receiving the system restore request, a new secondary storage drive is generated. The primary storage drive and the new secondary storage drive are then utilized for writing and reading data, in accordance with the present subject matter, after receiving the system restore request.

Furthermore, in an example implementation, the blocks of the primary storage drive that are allocated during the data backup mode of operation are protected from further modification after receiving the system restore request. After protecting these blocks of the primary storage drive, the data of the allocated blocks of the primary storage drive, including that of the protected blocks, and the data of the allocated blocks of the secondary storage drive, written before receiving the system restore request, are presented for copying. The data may be presented in a virtual storage drive for copying to a storage space. The data can be copied to an external storage space, or to the primary storage drive depending on the storage space available in the primary storage drive. The presenting of the data for copying, in accordance with the present subject matter, facilitates recovery of the latest data stored before restoring the computing system.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
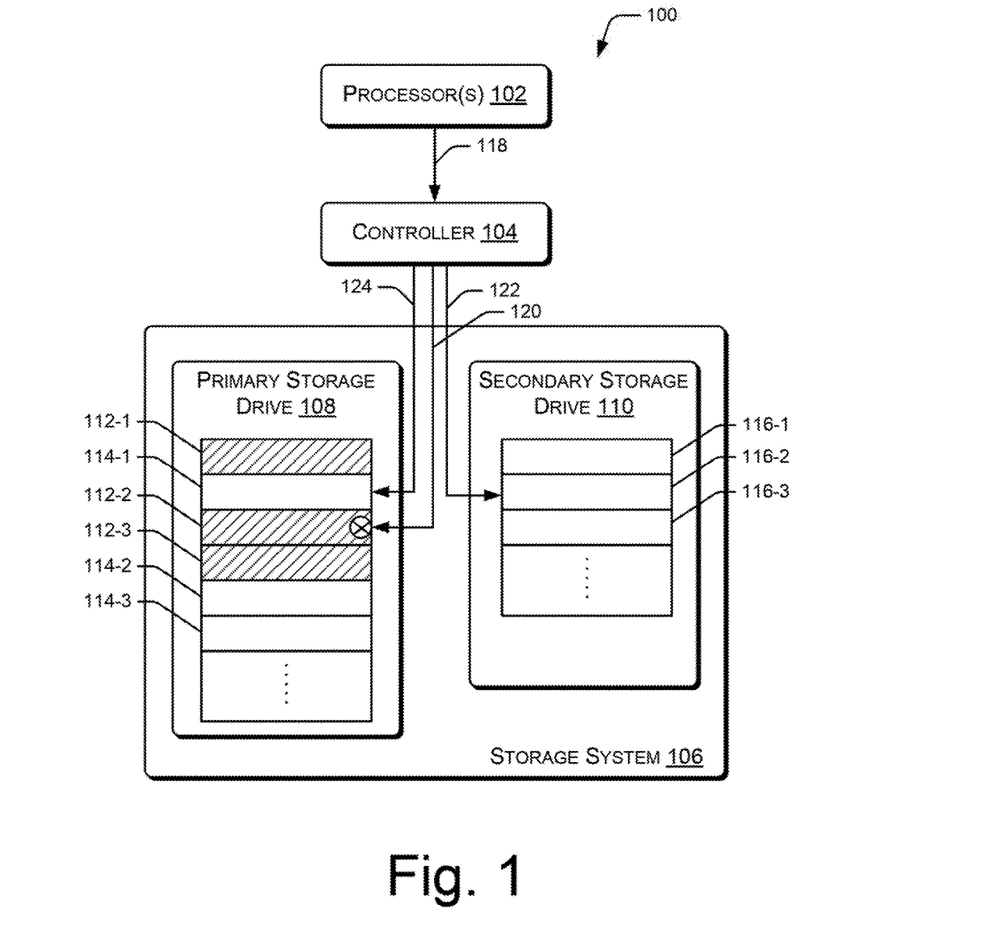
FIG. 1 illustrates a system environment for writing data during data backup, according to an example implementation of the present subject matter.

FIG. 1 illustrates a system environment for writing data during data backup, according to an example implementation of the present subject matter. The system environment may include a computing system 100 having at least one processor 102, a controller 104, and a storage system 106. The computing system 100 may be a desktop computer, a laptop computer, a tablet, a server, and the like. The storage system 106 includes at least one physical storage medium to store data associated with the computing system 100. The controller 104 is coupled to the processor(s) 102 and the storage system 106. The controller 104 captures read and write requests from the processor(s) 102, and processes the read and write requests to read data from and write data to the storage system 106 to enable data backup with efficient utilization of the physical storage media of the storage system 106. A read request refers to a request for reading data from the physical storage media of the storage system 106. A write request refers to a request for writing data to the physical storage media of the storage system 106. In an example implementation, the controller 104 also performs functions to enable system restore and recovery of latest data stored in the storage system 106 before initiating the system restore, in accordance with the present subject matter.

In an example implementation, the controller 104 may include at least one computer. The controller 104 may be implemented as microprocessors, microcomputers, microcontrollers, digital signal processors, central processing units, state machines, logic circuitries, and/or any devices that manipulate signals based on operational instructions. Among other capabilities, the controller 104 may fetch and execute computer-readable instructions stored in a memory coupled to the controller 104. The memory can be internal or external to the controller 104. The memory may include any non-transitory computer-readable storage medium including, for example, volatile memory (e.g., RAM), and/or non-volatile memory (e.g., EPROM, flash memory, NVRAM, memristor, etc.).

In an example, the processor(s) 102 may also be implemented as microprocessors, microcomputers, microcontrollers, digital signal processors, central processing units, state machines, logic circuitries, and/or any devices that manipulate signals based on operational instructions. Among other capabilities, the processor(s) 102 may fetch and execute computer-readable instructions stored in a memory coupled to the processor(s) 102. The memory can be physical storage media of the storage system 106. The physical storage media of the storage system 106 may include any non-transitory computer-readable storage medium including, for example, volatile memory (e.g., RAM), and/or non-volatile memory (e.g., EPROM, flash memory, NVRAM, memristor, etc.).

The functions of the various elements shown in FIG. 1, including any functional blocks labeled as "processor(s)" and "controller", may be provided through the use of dedicated hardware as well as hardware capable of executing computer-readable instructions.

In an example implementation, the processor(s) 102 may be of a computing device, and the storage system 106 is external to the computing device. The computing device is associated with the storage system 106 for storing data. In this example implementation, the processor(s) 102 of the computing device can be coupled to the controller 104, where the controller 104 performs functions for storing the data, backing up the data, restoring the computing device, and recovering the latest data stored in the storage system 106.

As used herein, 'coupled' may mean a direct connection between entities in consideration to exchange data signals with each other via an electrical signal, electromagnetic signal, optical signal, etc. For example, entities that may be directly communicatively connected with and/or collocated in/on a same device (e.g., a computer, a server, etc.) and communicatively connected to one another have been referred to be coupled with each other. Therefore, the computing resources communicating through a direct communication have been referred to be 'coupled' to each other.

The storage system 106, among other components and modules, includes a primary storage drive 108 and a secondary storage drive 110, as shown in FIG. 1. The primary storage drive 108 may be the main hard-disk that stores the data, including one of, or a combination of, the operating system data, the applications data, and other data generated and utilized for the operation of the computing system 100. The secondary storage drive 110 may be a backup storage drive for storing the data during a data backup mode of operation of the computing system 100. The secondary storage drive 110 may have a size substantially equal to the size of the data stored in the primary storage drive 108 before the computing system 100 is operated in the data backup mode. In an example implementation, the secondary storage drive 110 may be a partition of the primary storage drive 108.

In an example implementation, the secondary storage drive 110 has a backup file having a number of blocks equal to the number of blocks of the primary storage drive 108 that are allocated before the data backup mode of operation. The blocks of the primary storage drive 108 that are allocated before the data backup mode of operation may hereinafter be referred to as pre-allocated blocks. The blocks of the backup file of the secondary storage drive 110 may be at a same offset as the pre-allocated blocks of the primary storage drive 108. The blocks of the backup file may have one-to-one mapping with respect to the pre-allocated blocks of the primary storage drive 108, such that the backup file has one block corresponding to each pre-allocated block of the primary storage drive 108. In an example implementation, the backup file in the secondary storage drive 110 is a sparse file that enables the blocks with the same offset and one-to-one mapping with respect to the pre-allocated blocks. In an example implementation, the secondary storage drive 110 also includes a buffer space that stores various mapping tables, as described later in the description.

The description hereinafter describes, in detail, the operation of the controller 104 for writing data during the data backup mode of operation of the computing system 100, in accordance with an example implementation of the present subject matter. In one example, the primary storage drive 108 has a plurality of pre-allocated blocks and a plurality of unallocated or free blocks, before the data backup is initiated. The pre-allocated blocks may store the operating system data, the applications data, and other user data. The pre-allocated blocks of the primary storage drive 108 are referenced by 112-1, 112-2, and 112-3, and the unallocated blocks of the primary storage drive 108 are referenced by 114-1, 114-2, and 114-3, as shown in FIG. 1. Any write request received after initiating the data backup is either to modify the existing data or store new data. It may be noted that only three pre-allocated blocks 112-1, 112-2, and 112-3, and only three unallocated blocks 114-1, 114-2, and 114-3 are shown for simplicity. The primary storage drive 108 may include a number of pre-allocated blocks and a number of unallocated blocks depending on the size of data and the free storage space available in the primary storage drive 108, respectively. The pre-allocated blocks are collectively referenced by 112, and the unallocated blocks of the primary storage drive 108 are referenced by 114.

In an example implementation, the controller 104 receives a data backup request from the processor(s) 102. The data backup request is a request to operate the computing system 100 in the data backup mode. The processor(s) 102 may generate and send the data backup request based on a user input for data backup. In response to the data backup request, the controller 104 generates an initial storage mapping (ISM) table with information of the pre-allocated blocks 112. The ISM table also includes information of the unallocated blocks 114 of the primary storage drive 108. In an example implementation, the ISM table may depict a bit-map having 1's for the pre-allocated blocks 112 and 0's for the unallocated blocks 114.

Further, in response to the data backup request, the controller 104 generates the secondary storage drive 110. In an example implementation, the controller 104 generates the secondary storage drive 110 with a backup file and a buffer storage space. The backup file may be a sparse file. The controller 104 may partition the primary storage drive 108 to generate the secondary storage drive 110. As mentioned earlier, the backup file the secondary storage drive 110 may include a number of blocks equal to the number of pre-allocated blocks of the primary storage drive 108. The blocks in the backup file are initially unallocated. As shown in FIG. 1, the unallocated blocks of the backup file are referenced by 116-1, 116-2, and 116-3, corresponding to the pre-allocated blocks 112-1, 112-2, and 112-3. The unallocated blocks of the backup file may be collectively referenced by 116. Further, the controller 104 stores a copy of the ISM table in the buffer storage space in the secondary storage drive 110.

In the data backup mode of operation, the controller 104 may receive a write request 118 for writing data to a block of the primary storage drive 108. On receiving the write request 118, the controller 104 directs the write request 118 to the primary storage drive 108. The controller 104 determines whether the block associated with the write request 118 is an unallocated block of the primary storage drive 108, or an allocated block, i.e., a pre-allocated block, of the primary storage drive 108. The determination may be performed based on the ISM table. When the write request 118 is determined to be for a pre-allocated block of the primary storage drive 108, the controller 104 writes data associated with the write request 118 to the secondary storage drive 110. In this case, the data are written to an unallocated block of the backup file of the secondary storage drive 110 corresponding to the pre-allocated block of the primary storage drive 108. As shown in FIG. 1, when the write request 118 is for a pre-allocated block 112-2, the data are not written to the allocated block 112-2, depicted by an arrow 120, but are written to the unallocated block 116-2 of the backup file of the secondary storage drive 110, depicted by an arrow 122.

However, when the write request 118 is determined to be for an unallocated block of the primary storage drive 108, the controller 104 writes data associated with the write request 118 to the primary storage drive 108. In this case, the data are written to the unallocated block of the primary storage drive 108. The unallocated block is changed to an allocated block. As shown in FIG. 1, when the write request 118 is for an unallocated block 114-1, the data are written to the unallocated block 114-1, depicted by an arrow 124. It may be noted that if any subsequent write request is received for the block 114-1 allocated during the data backup mode of operation, the controller 104 overwrites the data in the block 114-1.

Further, in an example implementation, the controller 104 generates a PSM table and stores information of the blocks of the primary storage drive 108 that are allocated during the data backup mode of operation. The PSM table may also include information of the unallocated blocks of the primary storage drive 108. In an example implementation, the PSM table may depict a bit-map having a first status, for example '1', for the blocks of the primary storage drive 108 that are allocated during the data backup mode and a second status, for example '0', for the unallocated blocks of the primary storage drive 108. In an example implementation, the ISM table and the PSM table may be a single table, having information of the pre-allocated blocks, the blocks that are allocated during the data backup mode of operation, and the unallocated blocks. The PSM table may be stored in the buffer storage space of the secondary storage drive 110.

Further, the controller 104 generates a SSM table and stores information of the allocated blocks and the unallocated blocks of the secondary storage drive 110. In an example implementation, the SSM table may depict a bit-map having a first status, for example '0', for the unallocated blocks of the secondary storage drive 110 and a second status, for example '0', for the allocated blocks of the secondary storage drive 110. The SSM table may be stored in the buffer storage space of the secondary storage drive 110.

Figure 2:
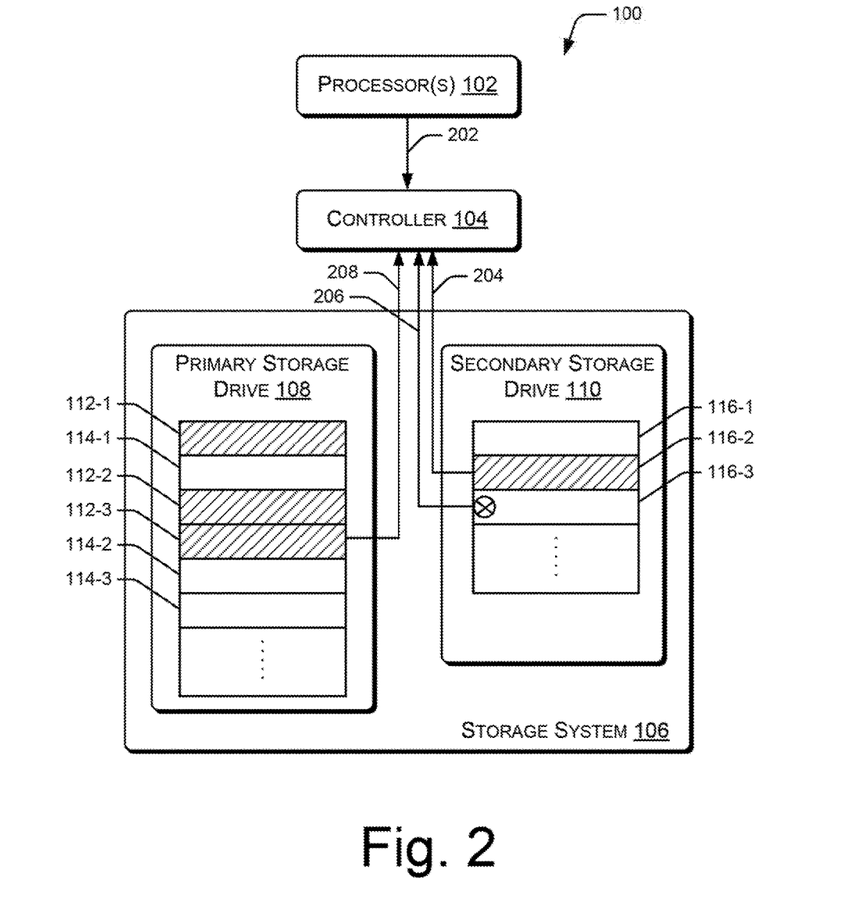
FIG. 2 illustrates the system environment for reading data during data backup, according to an example implementation of the present subject matter.

FIG. 2 illustrates the system environment 100 for reading data during data backup, according to an example implementation of the present subject matter. In the data backup mode of operation, the controller 104 may receive a read request 202 for reading data from the storage system 106. On receiving the read request 202, the controller 104 directs the read request 202 to the secondary storage drive 110. The controller 104 determines whether the read request 202 is for an unallocated block of the secondary storage drive 110, or for an allocated block of the secondary storage drive 110. The determination may be performed based on the SSM table. When the read request 202 is determined to be for an allocated block of the secondary storage drive 110, the controller 104 reads data associated with the read request 202 from the secondary storage drive 110. In this case, the data are read from the corresponding allocated block of the backup file of the secondary storage drive 110. As shown in FIG. 2, when the read request 202 is for the allocated block 116-2, the data are read from the allocated block 116-2, depicted by an arrow 204.

However, when the read request 202 is determined to be for an unallocated block of the secondary storage drive 110, the controller 104 reads data associated with the read request 202 from the primary storage drive 108. In this case, the data are read from the corresponding allocated block of the primary storage drive 108. As shown in FIG. 2, when the read request 202 is for an unallocated block 116-3, the data are not read from the unallocated block 116-3, depicted by an arrow 206, but are read from the pre-allocated block 112-3, depicted by an arrow 208.

The description hereinafter describes the operation of the controller 104 for restoring the computing system 100, in accordance with an example implementation of the present subject matter. It may be noted that the computing system 100 may be operating in the data backup mode, when the computing system 100 is to be restored. The computing system 100 may be restored when the operating system of the computing system turns unbootable, or the computing system 100 is infected with viruses or malware, or has misconfigured application updates. The computing system 100 may also be restored in case a user, for some reasons, wishes to bring the computing system 100 back to an earlier state.

In an example implementation, the controller 104 receives a system restore request from the processor(s) 102. The system restore request is a request to restore the computing system 100 to an earlier state. The processor(s) 102 may generate and send the system restore request based on a user input for system restore. In response to the system restore request, the controller 104 disregards the PSM table and the SSM table for reading and writing of data. By disregarding the PSM table and the SSM table, the computing system 100 is restored to a state existed before initiating the data backup in a manner that appears instantaneous to the user. The controller 104 refers to the ISM table for further writing of data.

Figure 3:
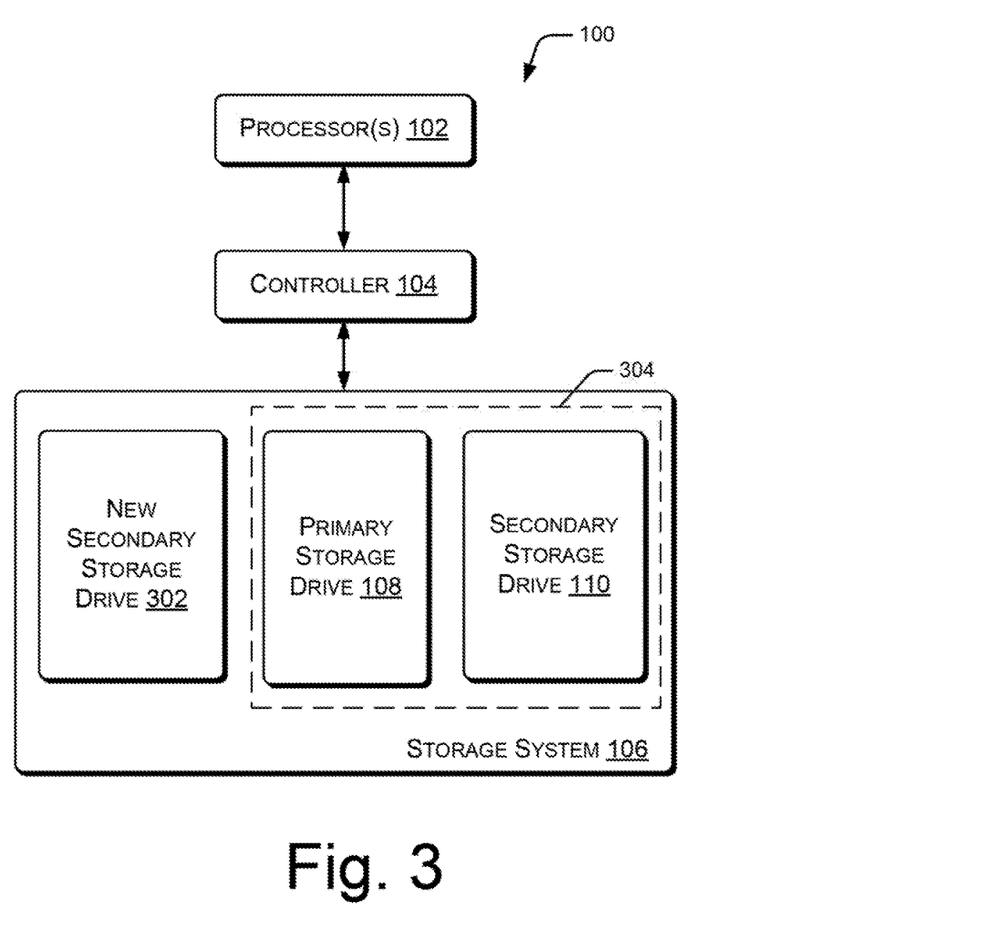
FIG. 3 illustrates the system environment after system restore, according to an example implementation of the present subject matter.

Further, after receiving the system restore request, the controller 104 generates a new secondary storage drive, and utilizes the new secondary storage drive along with the primary storage drive 108 for reading and writing of data. FIG. 3 illustrates the system environment 100 after system restore, according to an example implementation of the present subject matter. As shown in FIG. 3, the storage system 106 includes a new secondary storage drive 302. The controller 104 generates the new secondary storage drive 302 with a backup file and a buffer storage space, similar to the previously generated secondary storage drive 110. The controller 104 may partition the primary storage drive 108 to generate the new secondary storage drive 302, if the primary storage drive 108 has sufficient free storage space. The backup file of the new secondary storage drive 302 may include a number of blocks equal to the number of pre-allocated blocks of the primary storage drive 108. The blocks in the backup file of the new secondary storage drive 302 are initially unallocated. Further, the controller 104 stores a copy of the ISM table in the buffer storage space in the new secondary storage drive 302. The controller 104 may either generate an ISM table again, or copy the same stored in the buffer storage space of the previously used secondary storage drive 110. The controller 104 also maintains a new PSM table and a new SSM table based on subsequent write requests, and use the new PSM table and the SSM table for subsequent read and write requests in a similar manner as described earlier.

Further, in an example implementation, after receiving the system restore request, the controller 104 protects the blocks of the primary storage drive 108 that are allocated during the data backup mode of operation. The blocks are protected from modifications after receiving the system restore request. That is, any write request for a protected block is not allowed, so that the data of the protected block can be preserved. The controller 104 refers to the PSM table for protecting the blocks. For protecting the blocks, the controller 104 may either hide the blocks or make them read-only blocks. In an example implementation, the controller 104 may create a dummy file and associate the blocks that are to be protected to the dummy file.

Further, in an example implementation, after protecting the blocks, the controller 104 presents the data of the allocated blocks of the primary storage drive 108 and the data of the allocated blocks of the secondary storage drive 110 for copying to a storage space. This enables recovery of latest data stored in the storage system 106 up to the time of receiving the system restore request. The allocated blocks of the primary storage drive 108 include the pre-allocated blocks 112 and the protected blocks, i.e., the blocks of the primary storage drive 108 that are allocated during the data backup mode of operation.

Further, the controller 104 may present the data for copying in the form of a virtual storage drive. The virtual storage drive is referenced by 304 in FIG. 3. The virtual storage drive 304 is exposed to the processor(s) 102, and the user of the computing system 100 can copy the data from the virtual storage drive 304 to recover the latest data stored before the system restoration. The data from the virtual storage drive 304 can be copied to the primary storage drive 108 if the primary storage drive 108 has sufficient free storage space. The data from the virtual storage drive 304 can be copied to an external storage media, for example, a flash drive, a storage server, a cloud-enabled storage media, and the like.

In an example implementation, the computing system 100 may be rebooted for the purpose of restoring the computing system 100. The computing system 100 is rebooted if the operating system of the computing system 100 is running from a storage drive that is being backed up. In case the computing system 100 is rebooted after receiving the system restore request, the controller 104 shuts the computing system 100 down, and, before booting the computing system 100, the controller 104 disregards the PSM table and the SSM table, generates the new secondary storage drive 302, and protects the blocks of the primary storage drive 108 that are allocated during the data mode of operation.

In an example implementation, where the computing system 100 is capable of virtualization, the controller 104 is a system emulator, for example, a Quick Emulator (QEMU). In this implementation, the processor(s) 102 functions as a virtual machine that sends the read and the write requests to the system emulator. The system emulator provides the primary storage drive 108 and the secondary storage drive 110 of the storage system 106 as virtual storage drives to an operating system of the virtual machine for reading and writing of data. This facilitates a secure data backup and a secure system restore, since the backed up data and the tables stored in the storage system 106 are not exposed to the processor(s) 102, or to the operating system executed by the processor(s) 102.

In an example implementation, where the computing system 100 does not have virtualization capabilities, the controller 104 may be implemented as a storage system driver.

Figure 4:
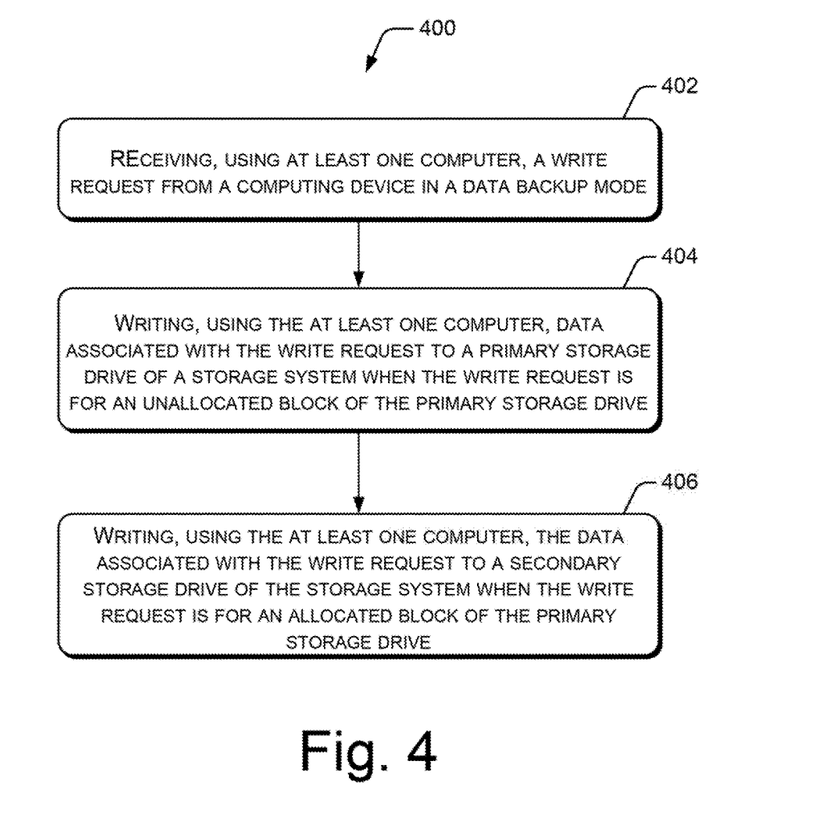
FIG. 4 illustrates a method of writing data during data backup in a storage system, according to an example implementation of the present subject matter.

FIG. 4 illustrates a method 400 of writing data during data backup in a storage system, according to an example implementation of the present subject matter. The order in which the method 400 is described is not intended to be construed as a limitation, and any number of the described method blocks can be combined in any order to implement the method 400. Furthermore, the method 400 can be implemented by processor(s) or computing device(s) through any suitable hardware, a non-transitory machine readable medium, or combination thereof. Further, although the method 400 is described in context of the aforementioned computing system 100, other suitable computing devices or systems may be used for execution of the method 400. It may be understood that processes involved in the method 400 can be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Referring to FIG. 4, at 402, a write request is received from a computing device in a data backup mode. The computing device may include processor(s) 102 that generates the write request. The write request is received using at least one computer. The at least one computer may be the controller 104. After receiving the write request, it is determined whether the write request is for an allocated block of the primary storage drive 108 or for an unallocated block of the primary storage drive 108. The determination is performed using the at least one computer. When the write request is for an unallocated block of the primary storage drive 108, data associated with the write request are written to the primary storage drive 108, at 404. In this case, the data are written using the at least one computer, for example the controller 104, to the unallocated block of the primary storage drive 108. When the write request is for an allocated block of the primary storage drive 108, the data associated with the write request are written to the secondary storage drive 110 of the storage system 106, at 406. In this case, the data are written using the at least one computer, for example the controller 104, to a block of the secondary storage drive 110 that corresponds to the allocated block of the primary storage drive 108, as described earlier.

Further, as mentioned earlier, a PSM table is maintained that stores information of blocks of the primary storage drive 108 that are allocated during the data backup mode. Also, an SSM table is maintained that stores information of unallocated blocks and allocated block of the secondary storage drive 108. The PSM table and the SSM table are maintained using the at least one computer.

Figure 5:
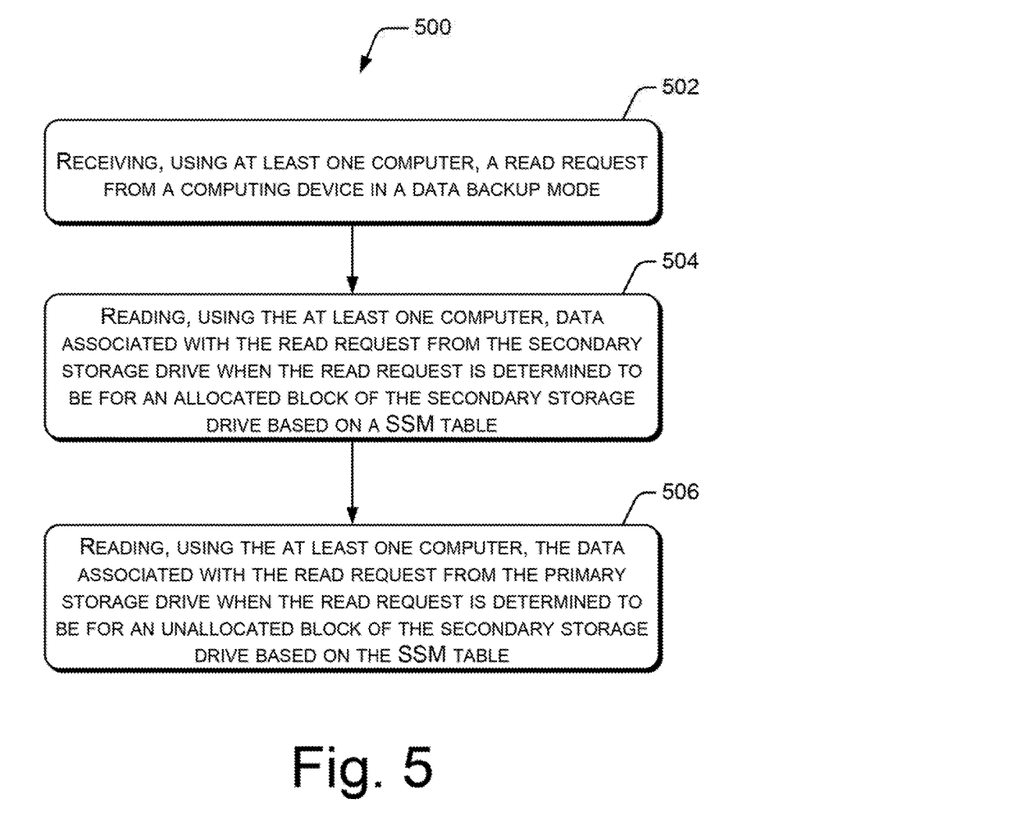
FIG. 5 illustrates a method of reading data during data backup in a storage system, according to an example implementation of the present subject matter.

FIG. 5 illustrates a method 500 of reading data during data backup in a storage system, according to an example implementation of the present subject matter. The order in which the method 500 is described is not intended to be construed as a limitation, and any number of the described method blocks can be combined in any order to implement the method 500. Furthermore, the method 500 can be implemented by processor(s) or computing device(s) through any suitable hardware, a non-transitory machine readable medium, or combination thereof. Further, although the method 500 is described in context of the aforementioned computing system 100, other suitable computing devices or systems may be used for execution of the method 500. It may be understood that processes involved in the method 500 can be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Referring to FIG. 5, at 502, a read request is received from a computing device in the data backup mode. The computing device may include processor(s) 102 that generates the read request. The read request is received using at least one computer. The at least one computer may be the controller 104. After receiving the read request, it is determined based on the SSM table whether the read request is for an allocated block of the secondary storage drive 110 or for an unallocated block of the secondary storage drive 110. The determination is performed using the at least one computer. When the read request is determined to be for an allocated block of the secondary storage drive 110, data associated with the read request is read from the secondary storage drive 110, at 504. In this case, the data are read using the at least one computer, for example the controller 104, from the allocated block of the secondary storage drive 110. When the read request is determined to be for an unallocated block of the secondary storage drive 110, the data associated with the read request is read from the primary storage drive 108, at 506. In this case, the data are read using the at least one computer, for example the controller 104, from the allocated block of the primary storage drive 108 that corresponds to the unallocated block of the secondary storage drive 110.

Figure 6:
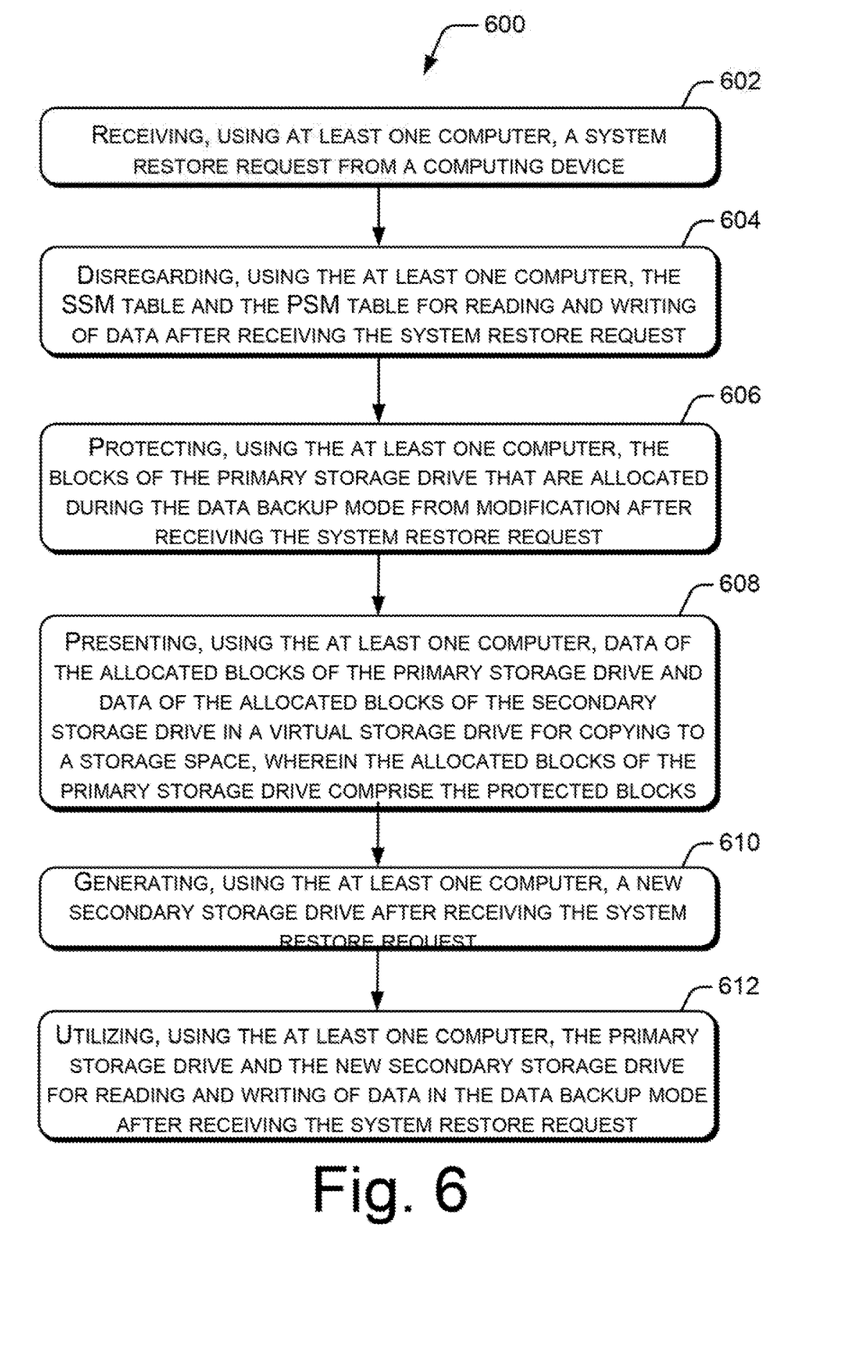
FIG. 6 illustrates a method of restoring a computing system, according to an example implementation of the present subject matter.

FIG. 6 illustrates a method 600 of restoring a computing system, according to an example implementation of the present subject matter. The order in which the method 600 is described is not intended to be construed as a limitation, and any number of the described method blocks can be combined in any order to implement the method 600. Furthermore, the method 600 can be implemented by processor(s) or computing device(s) through any suitable hardware, a non-transitory machine readable medium, or combination thereof. Further, although the method 600 is described in context of the aforementioned computing system 100, other suitable computing devices or systems may be used for execution of the method 600. It may be understood that processes involved in the method 600 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 6, at 602, a system restore request is received from a computing device. The computing device may include processor(s) 102 that generates the system restore request. The system restore request is received using at least one computer. The at least one computer may be the controller 104. In response to the system restore request, at 604, the SSM table and the PSM table are disregarded for reading and writing of data after receiving the system restore request. The SSM table and the PSM table are disregarded using the at least one computer, for example the controller 104. Further, at 606, the blocks of the primary storage drive that are allocated during the data backup mode are protected from modification after receiving the system restore request. Such blocks of the primary storage drive 108 are protected using the at least one computer, for example the controller 104, in a manner as described earlier in the description. After this, at 608, data of the allocated blocks of the primary storage drive 108 and data of the allocated blocks of the secondary storage drive 110 are presented in a virtual storage drive for copying to a storage space. The allocated blocks of the primary storage drive 108 include the protected blocks. The at least one computer, for example the controller 104, exposes the virtual storage drive with said data to the processor(s) 102 for copying to an external storage space or to the primary storage drive 108.

Further, after receiving the system restore request, at 610, a new secondary storage drive is generated. In an example, the new secondary storage drive 310 is generated using the at least one computer, for example the controller 104, by partitioning the primary storage drive 108. At 612, the primary storage drive and the new secondary storage drive are utilized for reading and writing of data in the data backup mode after receiving the system restore request. The primary storage drive and the new secondary storage drive are utilized using the at least one computer, for example the controller 104.

Figure 7:
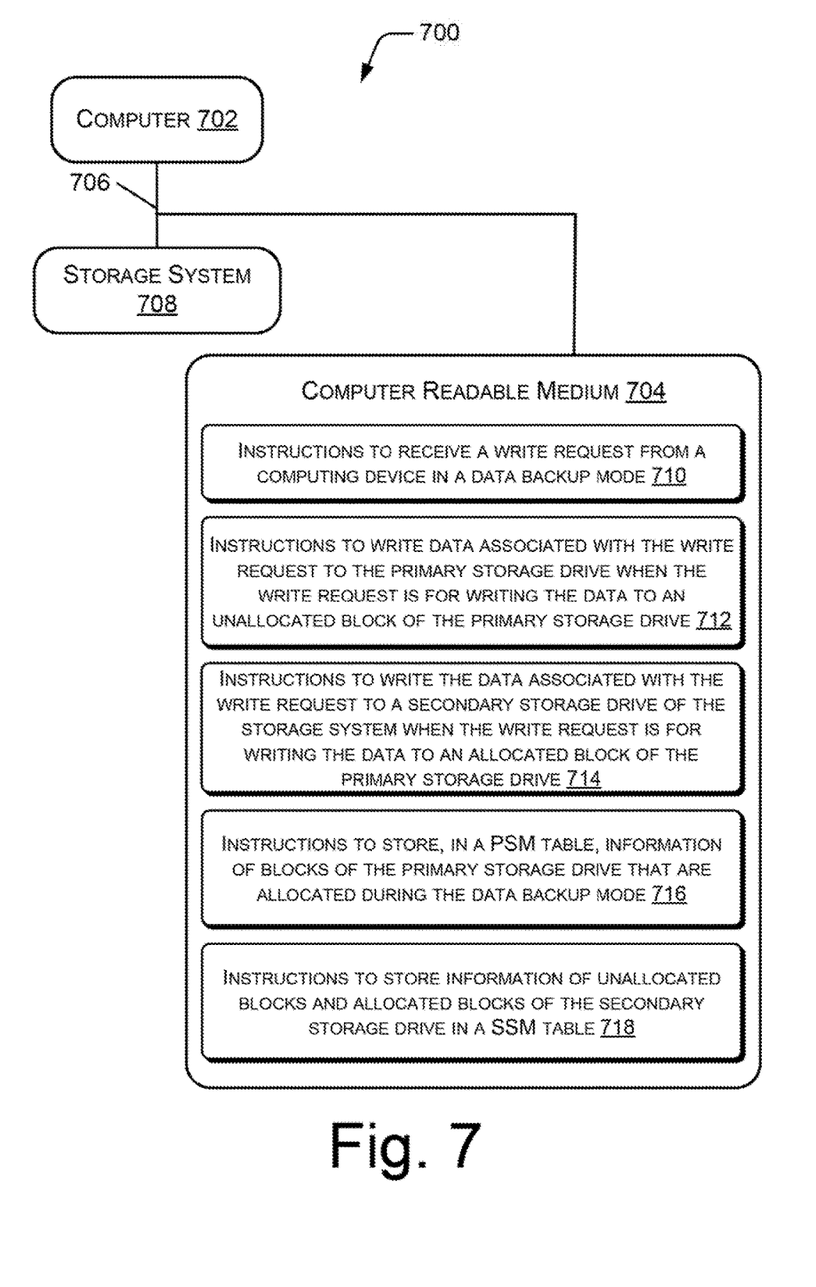
FIG. 7 illustrates a system environment, according to an example implementation of the present subject matter.

FIG. 7 illustrates an example system environment 700, according to an example implementation of the present subject matter. In an example implementation, the system environment 700 includes a computer 702 communicatively coupled to a non-transitory computer readable medium 704 through a communication link 706. The computer 702 has a processing resource for fetching and executing computer-readable instructions from the non-transitory computer readable medium 704.

The computer 702 and the non-transitory computer readable medium 704 are also communicatively coupled to a storage system 708. The storage system 708 can includes a primary storage drive and a secondary storage drive, as described earlier, for reading and writing data during a data backup mode.

The non-transitory computer readable medium 704 can be, for example, an internal memory device or an external memory device. In an example implementation, the communication link 706 may be a direct communication link, such as any memory read/write interface. In another example implementation, the communication link 706 may be an indirect communication link, such as a network interface. In such a case, the computer 702 can access the non-transitory computer readable medium 704 through a network (not shown). The network may be a single network or a combination of multiple networks and may use a variety of different communication protocols.

In an example implementation, the non-transitory computer readable medium 704 includes a set of computer readable instructions for data backup, system restore, and recovery of data. The set of computer readable instructions can be accessed by the computer 702 through the communication link 706 and subsequently executed to perform acts for data backup, system restore, and recovery of data.

Referring to FIG. 7, in an example, the non-transitory computer readable medium 704 includes instructions 710 that cause the computer 702 to receive a write request from a computing device in a data backup mode. The non-transitory computer readable medium 704 includes instructions 712 that cause the computer 702 to write data associated with the write request to a primary storage drive of the storage system 708 when the write request is for writing the data to an unallocated block of the primary storage drive. The non-transitory computer readable medium 704 includes instructions 714 that cause the computer 702 to write the data associated with the write request to a secondary storage drive of the storage system 708 when the write request is for writing the data to an allocated block of the primary storage drive. The non-transitory computer readable medium 704 includes instructions 716 that cause the computer 702 to store, in a PSM table, information of blocks of the primary storage drive that are allocated during the data backup mode. The non-transitory computer readable medium 704 includes instructions 718 that cause the computer 702 to store information of unallocated blocks and allocated blocks of the secondary storage drive in an SSM table.

In an example implementation, the non-transitory computer readable medium 704 may further include instructions that cause the computer 702 to: receive a read request from the computing device in the data backup mode; read data associated with the read request from the secondary storage drive when the read request is determining to be for an allocated block of the secondary storage drive based on the SSM table; and read the data associated with the read request from the primary storage drive when the read request is determining to be for an unallocated block of the secondary storage drive based on the SSM table.

In an example implementation, the non-transitory computer readable medium 704 may further include instructions that cause the computer 702 to receive a system restore request from the computing device, and disregard the SSM table and the PSM table for reading and writing of data after receiving the system restore request. In an example implementation, the non-transitory computer readable medium 704 may further include instructions that cause the computer 702 to generate a new secondary storage drive after receiving the system restore request, and utilize the primary storage drive and the new secondary storage drive for reading and writing of data in the data backup mode after receiving the system restore request.

In an example implementation, the non-transitory computer readable medium 704 may further include instructions that cause the computer 702 to protect the blocks of the primary storage drive that are allocated during the data backup mode from modification after receiving the system restore request. The non-transitory computer readable medium 704 may further include instructions that cause the computer 702 to present data of the allocated blocks of the primary storage drive and data of the allocated blocks of the secondary storage drive in a virtual storage drive for copying to a storage space. The allocated blocks of the primary storage drive 108 include the protected blocks.

Although implementations for data backup, system restore, and recovery of data have been described in language specific to structural features and/or methods, it is to be understood that the present subject matter is not necessarily limited to the specific features or methods described. Rather, the specific features and methods are disclosed and explained as example implementations for data backup, system restore, and recovery of data in computing systems.

What is claimed:

1. A method comprising:
receiving, using at least one computer, a write request from a computing device in a data backup mode;
writing, using the at least one computer, data associated with the write request to a primary storage drive of a storage system when the write request is for an unallocated block of the primary storage drive, wherein the unallocated block of the primary storage drive has not been allocated for use by a file system; and
writing, using the at least one computer, the data associated with the write request to a secondary storage drive of the storage system when the write request is for an allocated block of the primary storage drive, wherein the allocated block of the primary storage drive has been allocated for use by a file system.

2. The method as claimed in claim 1, comprising:
maintaining, using the at least one computer, a primary storage mapping (PSM) table that stores information of blocks of the primary storage drive that are allocated during the data backup mode; and
maintaining, using the at least one computer, a secondary storage mapping (SSM) table that stores information of unallocated blocks and allocated blocks of the secondary storage drive.

3. The method as claimed in claim 2, comprising:
receiving, using the at least one computer, a read request from the computing device in the data backup mode;
reading, using the at least one computer, data associated with the read request from the secondary storage drive when the read request is determined to be for an allocated block of the secondary storage drive based on the SSM table; and
reading, using the at least one computer, the data associated with the read request from the primary storage drive when the read request is determined to be for an unallocated block of the secondary storage drive based on the SSM table.

4. The method as claimed in claim 2, comprising:
receiving, using the at least one computer, a system restore request from the computing device; and
disregarding, using the at least one computer, the SSM table and the PSM table for reading and writing of data after receiving the system restore request.

5. The method as claimed in claim 4, comprising:
protecting, using the at least one computer, the blocks of the primary storage drive that are allocated during the data backup mode from modification after receiving the system restore request; and
presenting, using the at least one computer, data of the allocated blocks of the primary storage drive and data of the allocated blocks of the secondary storage drive in a virtual storage drive for copying to a storage space, wherein the allocated blocks of the primary storage drive comprise the protected blocks.

6. The method as claimed in claim 4, comprising:
generating, using the at least one computer, a new secondary storage drive after receiving the system restore request; and
utilizing, using the at least one computer, the primary storage drive and the new secondary storage drive for reading and writing of data in the data backup mode after receiving the system restore request.

7. The method as claimed in claim 6, wherein the generating comprises partitioning the new secondary storage drive from the primary storage drive.

8. A computing system comprising:
a processor;
a storage system to store data; and
a controller coupled to the processor and to the storage system, to:
receive a data backup request from the processor to operate the computing system in a data backup mode;
generate an initial storage mapping (ISM) table with information of blocks of a primary storage drive of the storage system that are allocated before receiving the data backup request;
receive a write request from the processor in the data backup mode;
write data associated with the write request to the primary storage drive when the write request is for writing the data to an unallocated block of the primary storage drive, wherein the unallocated block of the primary storage drive has not been allocated for use by a file system; and
write the data associated with the write request to a secondary storage drive of the storage system when the write request is for writing the data to an allocated block of the primary storage drive, wherein the allocated block of the primary storage drive has been allocated for use by a file system.

9. The computing system as claimed in claim 8, wherein blocks of the secondary storage drive are at a same offset as blocks of the primary storage drive, and wherein the controller is to write the data to a block of the secondary storage drive at the same offset as the allocated block of the primary storage drive.

10. The computing system as claimed in claim 8, wherein controller is to:
store, in a primary storage mapping (PSM) table, information of blocks of the primary storage drive that are allocated during the data backup mode; and
store information of unallocated blocks and allocated blocks of the secondary storage drive in a secondary storage mapping (SSM) table, wherein the SSM table represents a first status for the unallocated blocks of the secondary storage drive and a second status for the allocated blocks of the secondary storage drive.

11. The computing system as claimed in claim 10, wherein the controller is to:
receive a read request from the processor in the data backup mode;
read data associated with the read request from the secondary storage drive when the read request is determining to be for an allocated block of the secondary storage drive based on the SSM table; and
read the data associated with the read request from the primary storage drive when the read request is determining to be for an unallocated block of the secondary storage drive based on the SSM table.

12. The computing system as claimed in claim 10, wherein the controller is to:
receive a system restore request from the processor;
disregard the SSM table and the PSM table for reading and writing of data after receiving the system restore request;
protect the blocks of the primary storage drive that are allocated during the data backup mode from modification after receiving the system restore request; and present data of the allocated blocks of the primary storage drive and data of the allocated blocks of the secondary storage drive in a virtual storage drive for copying to a storage space, wherein the allocated blocks of the primary storage drive comprise the protected blocks.

13. The computing system as claimed in claim 8, wherein the controller is a system emulator that provides the primary storage drive and the secondary storage drive as virtual storage drives to an operating system executing on the processor.

14. A non-transitory computer-readable medium comprising computer-readable instructions, which, when executed by a computer, cause the computer to:
receive a write request from a computing device in a data backup mode;
write data associated with the write request to the primary storage drive when the write request is for writing the data to an unallocated block of the primary storage drive, wherein the allocated block of the primary storage drive has been allocated for use by a file system;
write the data associated with the write request to a secondary storage drive of the storage system when the write request is for writing the data to an allocated block of the primary storage drive, wherein the allocated block of the primary storage drive has been allocated for use by a file system;
store, in a primary storage mapping (PSM) table, information of blocks of the primary storage drive that are allocated during the data backup mode; and
store information of unallocated blocks and allocated blocks of the secondary storage drive in a secondary storage mapping (SSM) table.

15. The non-transitory computer-readable medium as claimed in claim 14, wherein the instructions which, when executed by a computer, cause the computer to:
receive a read request from the computing device in the data backup mode;
read data associated with the read request from the secondary storage drive when the read request is determining to be for an allocated block of the secondary storage drive based on the SSM table; and
read the data associated with the read request from the primary storage drive when the read request is determining to be for an unallocated block of the secondary storage drive based on the SSM table.

\* \* \* \* \*